2,868,771

POLYMERIZATION OF OLEFINS

Richard L. Ray and Thomas O. Sistrunk, Baton Rouge, La., assignors to Ethyl Corporation, New York, N. Y., a corporation of Delaware No Drawing. Application July 17, 1956
Serial No. 598,226

6 Claims. (Cl. 260—94.9)

This invention relates to the polymerization of hydrocarbon olefins and more particularly, but not exclusively, to the polymerization of ethylene to produce solid polymers.

Several of the hydrocarbon olefins are polymerizable to solid polymers having desirable physical properties. Probably the most important of such polymers is polyethylene since it is produced from ethylene, one of the cheapest monomers presently available. A number of processes are useful for polymerization of ethylene but each have certain inherent disadvantages. For example, the polyethylene currently manufactured is made using oxygen or peroxide catalysis. This process requires extremely high pressures and results in a product having a relatively low melting point and certain other inferior physical properties, at least for certain uses. Other processes require the use of expensive or otherwise disadvantageous chemical catalysts and, in many cases, provide only low catalyst utilization.

It is accordingly an object of this invention to provide a new and improved process for polymerizing hydrocarbon olefins. An additional object is to provide a process whereby hydrocarbon olefins, particularly ethylene, can be polymerized to obtain essentially complete production of a solid polymer having highly desirable properties. Still another object is to provide a process which can be directed and controlled to provide polymers of relatively uniform physical properties. In specific embodiments, an object is to provide products consisting essentially of all solid polymeric material, without conjoint production of polymers of such low molecular weight ranges that they are normally liquid oils. A further specific object is to provide a new and novel catalyst system for employment in the said process, this catalyst system providing the advantages of controllable and easily initiated rate of reaction, and ready direction of the polymerization reaction to the desired grade or types of polymer. A further object is to provide a catalyst system and a process which permits and provides a high production of polymer per unit time, per unit of catalyst system, and per volume of reaction space. Alternatively, an object is to provide a catalyst system which, when desired, permits prolonging or smoothing out the polymerization to simplify the reaction system and its control. Other objects and advantages will be apparent hereinafter.

It has now been found that these and other objects are attained by contacting the hydrocarbon olefin, under relatively moderate temperature and pressure conditions, with a catalyst system including a primary system of a metal selected from Group III–A of the Mendeleev Periodic Table, plus a halogen containing compound of a refractory metal, and in addition a relatively small portion of an oxygen containing, directing material. By halogen containing compound of a refractory metal is meant such a compound of a metal of Groups IV–B, V–B or VI–B of the Periodic Table corresponding to the table on pages 392 and 393 of the Handbook of Chemistry and Physics, 36th edition, Chemical Rubber Publishing Company. The oxygen containing, directing materials, or catalyst adjuvants include directly available oxygen per se, in some fluid form (e. g., gaseous or dissolved), or materials providing highly available oxygen, these materials including a variety of highly oxidized or peroxygen compounds of both organic and inorganic character.

The oxygen directing materials are so termed because of the discovery that, when employed with the primary catalyst system, they exhibit a dual effect. More specifically, they can be employed to affect the rate of reaction and, in addition, affect the properties of the product formed. Certain members or classes of the oxygen containing materials affect more strongly the rate of formation and to a lesser degree the properties of the polymer. On the other hand, other groups affect more strongly the properties of the product polymer material and to a lesser degree the rate of formation. By the appropriate choice of the oxygen containing directing material and the concentration thereof, a reaction can be controlled and directed to rapidly and effectively produce a desired polymeric product at a rate and yield acceptable for commercial practice.

Returning to the components of the primary catalyst system, a particularly suitable Group III–A metal is aluminum, preferably subdivided or comminuted for maximum effectiveness. The subdivision is carried out under such circumstances that the surfaces of the metal are not degraded by reaction. Turnings of the metal can be made under an inert solvent or atmosphere. This technique is also applicable to the other solid metals of this subgroup. A particularly active form of metal is produced electrolytically by the cathodic deposition of an organometallic compound of the metal, for example, aluminum triethyl. Indium, thallium, and gallium are also highly effective members of the group suitable for this component of the primary catalyst system although they are somewhat more expensive than aluminum metal.

As already noted, the second component of the primary catalyst system is a halogen containing compound of a Group IV–B, V–B or VI–B metal. This permits a wide latitude in selection of acceptable and effective components. Among those utilizable are titanium trichloride, vanadium pentachloride, chromium oxychloride, titanium tetrachloride, titanium tetrabromide, tetraiodide, etc. The mixed halides of these refractory metals are also suitable. For example, titanium monochloride trifluoride or other compounds having similar empirical formulas.

The oxygen containing directing material or adjuvants, are characterized as materials having highly available oxygen. The availability may be initially as molecular oxygen or as the oxygen content of certain compounds. Thus, these adjuvants may include oxygen gas per se, either pure or diluted as in air, nitrogen being an inert diluent, or oxygen releasing gases such as ozone. The oxygen can also be introduced in solution in an inert solvent if desired. The characteristic of the other oxygen containing compounds suitable in the invention is that they are highly oxidized materials commonly called peroxygens having a plurality of oxygen atoms in the molecule and providing readily available oxygen by reactions such as decompositions, metathetical reactions and others. It will be readily understood that highly stable oxygenated materials are not contemplated by this invention, for example, water, iron oxide or similar materials of stable chemical configuration. The effective adjuvants all appear to be materials which supply oxygen at reaction conditions although the mechanism is not precisely known. These compounds include not only inorganic peroxygen compounds, but also a wide variety of organic material. Illustrative examples of this type of catalyst director are peroxides of the alkali metals, metal persulfates, metal peracids and others. Typical examples of the organic peroxides are perbenzoic acid, tertiary butyl peracetate, lauroyl peroxide, ditertiary butyl peroxide and others as discussed hereinafter. Generally, it is found that the oxygen containing material, if originally in a gaseous state benefits especially the character of product produced in addition to readily initiating the reaction and maintaining a good rate of production. The inorganic and organic peroxides when employed are particularly effective in promoting the rate of reaction but also to a notable extent, provide particularly beneficial polymer products. Generally, in providing the oxygen containing material, wide latitude in proportions is permissible depending in part on the results desired. In all instances, the oxygen containing material is employed as a minor component, relative to the refractory metal halides in the primary catalyst system. Thus, the oxygen proportion, whether initially free or combined, is used in the concentration of from 0.00001 to about 0.10 mole of oxygen to one mole of the halogen compound. A preferred range is from 0.001 to about 0.05 mole of oxygen, free or combined, to one mole of the halogen compound.

The actual function of the oxygen containing materials in the present polymerization system is not fully understood. Normally, it would be expected that chemically available oxygen would be very undesirable in any quantity in this catalyst system since it would be expected under reaction conditions to react with the surfaces of the metal component and thus deactivate the metal. Likewise, such materials would not be expected to give any desirable reaction product with the halogen containing metal compounds, such as titanium tetrachloride.

As mentioned above, oxygen and peroxide catalysts have been used alone in the prior high pressure olefin polymerization process, but the dual effect of the oxygen directing compounds of the present invention when added to an olefin polymerization catalyst system is not universally applicable. We have made the surprising discovery that only certain polymerization catalyst systems are benefited when employing an oxygen containing material as a reaction director, and further, that the advantages described herein are not obtained if any one of the three components of our catalyst system is omitted. These advantages are further demonstrated by the specific examples hereinafter.

Although the reaction conditions are not critical, it is desirable to carry out the polymerization at a temperature of from 0°–250° C. and preferably from 50°–150° C. The advantages of our process are obtained at relatively low pressures of from subatmospheric to about 250 atmospheres, although a pressure of olefin between about 1–100 atmospheres is preferred. The process can be carried out in bulk although the use of solvents is normally preferred.

As already noted, we have found that both the rate of polymer formation and the properties of the reactant polymer produced are effected by members of this class. Certain types of oxygen directors accentuate particularly the rate of reaction with less proportionate effect on the polymer properties, whereas other members predominantly effect the polymer properties and less markedly effect the rate of formation. The rate of reaction is very significantly effected as a general matter, being increased by a factor several hundred percent in substantially all instances. Various embodiments or members of the oxygen containing directing materials having varying effectiveness with respect to this benefit, and can be selected on such a basis if desired. The second effect exhibited in varying degree by all members of this class is a change in the properties of the polymeric materials produced. The precise gradation of changes of the several factors will depend to some extent upon the monomer being reacted. However, for illustrative purposes, properties of importance when producing a solid polyethylene, can be enumerated. These include the melting point of the solidified polymer, the molecular weight or average molecular weight of these solids, and various strength tests including elongation at break, strength at yield or break, and flexural modulus. Generally, it is observed that the class of oxygen containing directing materials which are essentially free oxygen or which releases free oxygen easily by physical means, have an accentuated effect on the properties of the product polymers. On the other hand, the members of this class of materials which contribute the reaction directing effect because of being highly oxidized compounds, tend to provide an accentuated effect in promoting the rate of reaction, with a less significant effect on the properties of the polymer products. The practical significance of this is, of course, of extreme importance in that when reaction rate itself is a highly desirable objective, and quality control is less significant, materials disclosed herein containing highly available oxygen can be selected upon this basis. Indeed, the generally accepted criteria of solid polymer quality is somewhat misleading inasmuch as for certain markets the reverse trend of attributes might be desirable, as in the 1-use throw away field.

The mode of carrying out the invention and the advantages, particularly, of specific embodiments will be understood and demonstrated by the examples below. For "base line" or contrast purposes, the first example below illustrates performance with a primary catalyst system absent any oxygen directing material.

*Example I*

A cylindrical pressure vessel, provided with an internal agitator was prepared for operation by carefully drying, with an atmosphere of inert gas. It was then charged with 250 parts of sodium dried pure hexane, 4 parts of comminuted active aluminum, and 8 parts (0.042 mole) of titanium tetrachloride. The autoclave was then pressurized with pure ethylene to a pressure of about 20 p. s. i. g., and this was then vented. This purging operation was repeated a second time and then pressurized for the third time to 20 p. s. i. g. The autoclave was then heated by a surrounding bath of heat transfer material to a temperature of about 100° C. The ethylene pressure was then increased to 600 p. s. i. g. During the foregoing operations the contents of the autoclave were agitated continuously.

The ethylene pressure was maintained for an extended period. The reaction started sluggishly and proceeded at a moderate rate, as evidenced by an increase in reaction mixture temperature of the order of 5° C. in 30 minutes. After a period of 6 hours the ethylene supply was cut off, the excess pressure vented, and the autoclave and contents cooled to ambient temperatures.

The autoclave was then opened and solid polymers were observed in the vessel, most of the solvent having been evaporated in venting. These crude solids were removed and weighed and 40 parts by weight were found. These solids were then placed in xylene maintained at a temperature of 120° C. in contact with a layer of ethylene glycol which is immiscible in the xylene and forms a separate layer at the bottom of the vessel. The system was intermittently stirred. The polymer gradually become a clear gelatinous material and the ethylene glycol layer became a deep reddish-brown color. The clear polymer layer was thereafter decanted from the ethylene glycol and the polymer was precipitated from the xylene by the addition of anhydrous methanol. The solid polymer was thereafter washed by agitation with acetone and dried in a vacuum oven. A portion of the white dry polymer was pressed between heated plates into a clear, transparent semi-flexible sheet. Strips of these sheets were tested in an Instron Universal tester. The tensile strength of the test sample at yield was 2700 p. s. i., with an elongation of 12 percent at yield. The elongation at break was 100 percent. A flexural modulus of about 80,000 p. s. i. was measured.

The polymer has a melting point of 129° C. The melting point was obtained by using a standard polarizing microscope having a heating stage. The temperature of the sample was gradually raised while observing the sample between cross polarizers. Crystallinity of the sample was manifested by a grayish color and its characteristic structural appearance. As the temperature approached the melting point, the color darkened and at the melting point the color sharply disappeared. This point is the point of disappearance of crystallinity or birefringence. Such a melting point is very sharp and highly reproducible.

Example II

The identical procedure as described above for Example I was followed in this instance, except that 0.016 part (0.0005 mole) of gaseous oxygen was metered into the autoclave to give an oxygen:titanium tetrachloride mole ratio of 0.012.

The reaction initiated promptly and proceeded at a respectable rate as evidenced from the yield of product. The feed of ethylene was discontinued after only 3 hours, and upon opening the reactor 227 parts of crude reddish-brown solids were found. These were purified as already described and a portion pressed into a sheet for testing. The properties of tested specimens were as follows: tensile strength at yield 2900 p. s. i., flexural modulus 75,000 p. s. i., and an elongation at break of 500 percent. The polymer had a melting point of 131° C.

It will be apparent for comparison of the results of Example I and II that the employment of oxygen as an oxygen containing directing material resulted in an improvement of the elongation at break of 5-fold, a very desirable product attribute for purposes such as fibers, films, or drawing sheets.

Another special benefit derived from this embodiment of the invention is an increase in production rate of 11-fold, in the same equipment.

A further significant advantage of the product obtained when using the oxygen containing catalysts is the different melting point, determined by the technique mentioned above. Generally it has been found upon the basis of many observations, that the melting point of solid polymers produced by the present process is intimately correlatable with brittleness of such materials, as they have the same general structural features and crystallinity characteristics. In fact there is strong evidence, that polymers melting above 130° C. are characterized by being pliable without rupture, whereas those melting below 130° C. tend strongly to be brittle and easily broken. It will, of course, be understood that in many cases it will be desirable to produce a product having a certain brittleness, for articles intended for once only usage.

Example III

Example II above was generally repeated, except that, instead of gaseous oxygen, sodium peroxide in the proportions of 0.1 part was added, this providing combined oxygen content of the catalyst system in the proportions of 0.03 mole to one mole of the titanium tetrachloride. The reaction proceeded quite rapidly, resulting in 150 parts of polymer after 2.5 hours reaction time.

From the foregoing, it is seen that an increase in production rate of about 9-fold, or 900 percent increase, was achieved, by comparison with Example I. The polymer generally had good properties, although the melting point was 130° C., this being on the border line of products having a maximum degree of flexibility. It will further be noted that the proportions of the sodium peroxide in the above example is relatively high within the preferred range of 0.001–0.05. Under these circumstances oxygen containing materials of this character, viz., inorganic peroxides, predominately exert a beneficial effect on the rate of production, and have less pronounced benefits with respect to the product properties.

When Examples II or III are repeated using fluid forms of oxygen such as ozone, or when the oxygen is initially introduced as a solute in a portion of the solvent or using, for example, lithium peroxide, ammonium peroxide, sodium persulfate, potassium perborate, sodium perchlorate, sodium perbromate, generally similar results are achieved. Percarbonates and peracids are, in addition, suitable examples of oxygen containing materials, for example, peroxy propionic acid, as are, in addition, the perhalides of alkali and alkaline earth metals, including, for example, lithium perchlorate, calcium perchlorate, and sodium periodate.

It will be understood that the proportion of the oxygen containing directing material is of significance in any particular embodiment of the process, and that alteration of the concentration of the several examples cited above can be effectively utilized for various purposes. The examples immediately hereafter illustrate in part the effect of the concentration variable.

Example IV

Example I was repeated except that the oxygen concentration was reduced to give an oxygen to titanium tetrachloride mole ratio of 0.006. The reaction proceeded somewhat faster than in Example I. The polymer (180 parts) was thereafter worked up in accordance with the procedure of Example I and had a tensile strength of 2900 p. s. i., a flexural modulus of 75,000 p. s. i., an elongation at break at 200 percent, and a melting point of 132° C.

By contrast of the results achieved in the above operation with the results of Example II, it is seen that the polymer melting point was somewhat higher, but the production rate increase over the results of Example I was 9-fold, instead of 11-fold.

As heretofore mentioned, a wide variety of organic peroxygen compounds are suitable as the oxygen containing reaction directors, either solely or in conjunction with additional examples. A highly effective material of this character is benzoyl peroxide, its effectiveness being demonstrated in the following example.

Example V

The procedure of Example I is repeated, except that 0.05 part of benzoyl peroxide was used as the oxygen containing material. This corresponds to an oxygen to titanium tetrachloride mole ratio of 0.01:1, and the operating temperature was roughly 5° C. lower. Approximately 180 parts of polymer were produced in 2½ hours.

Example VI

The same procedure as in Example V, above, was used, except that the amount of benzoyl peroxide was increased to provide a total oxygen content in proportions of 0.02 mole to one mole of the titanium tetrachloride. The reaction in this instance proceeded quite rapidly and rose sharply, during initial stages to about 111° C. Upon termination of operation after two hours, again about 175 parts of solid polymer were obtained.

Example VII

Example V was repeated except that 0.5 part of benzoyl peroxide was employed, giving an oxygen content; titanium tetrachloride ratio of 0.10:1, or ten times the ratio of Example V. The temperature in this reaction rose sharply to a maximum of 128° C. and the yield of polymer was even greater than that obtained in Example V.

In all the foregoing operations (Examples V–VII inclusive) the production rate of solid polymer, or rate of reaction, was increased by a factor of about 15 fold. The primary effect of the higher concentration of the benzoyl peroxide was a tendency to produce a polymer having a lower molecular weight, which was nevertheless a good polymer by commercial standards.

When the above examples are repeated, but the benzoyl peroxide is replaced by other organic peroxygen compounds, namely, peracetic acid, perbenzoic acid, tertiary butyl peracetate, lauroyl peroxide, urea peroxide, tetralin peroxide, ditertiary butyl peroxide and diacetyl peroxide generally similar results are provided and the same trends are obtained. Other examples are diethyl peroxide, propionyl peracids, cumene hydroperoxide, tertiary butyl hydroperoxide, 2,2-bis(t-butyl peroxy)butane, tetralin hydroperoxide, t-butyl perbenzoate, di-isopropyl benzene hydroperoxide, and the like.

It has been noted that a group III–A metal is one of the necessary components of the catalyst system, aluminum being an especially effective example. Gallium metal is another readily used metal for this purpose, as shown by the following example.

*Example VIII*

Example II was repeated except that one part of gallium was employed instead of the aluminum. Since the gallium is liquid, it did not require comminution to provide active metallic surfaces. The crude product was processed in accordance with Examples I and II. A product was obtained having generally similar properties to that provided by Example II.

Other group III–A metals can be employed in the above examples in place of aluminum or gallium, including indium and thallium, with generally similar results.

Other forms of active metal can be employed. Metal turnings prepared in the presence of air are effective in the present process except that somewhat lower activity of the metal is noted. A particularly active form of metal is produced electrolytically in which aluminum or other group III–A metal is deposited in the cathode by the electrolysis of a corresponding organometallic compound, e. g. aluminum triethyl.

The above examples illustrate the use of different quantities of metals, e. g., aluminum, to the quantity of halide-containing metal compound. In general, the molecular ratio of elemental metal to halogen metal compound can vary from about 0.01 to about 100. Even lower and higher ratios can be employed if desired although there is generally no advantage in employing either of these components in any appreciable excess. Preferably, a mole ratio of between about 0.1 and 50 should be employed.

Other group IV–B, V–B and VI–B metal halogen-containing compounds can be employed although the titanium halides and in particular the chlorides are by far the most effective. The following examples illustrate other halogen-containing metal compounds useful in this invention.

*Example IX*

Example II is repeated except that titanium trichloride is employed instead of titanium tetrachloride. A very fast reaction rate is obtained and a polymer equivalent to that of Example II is produced.

*Example X*

Example II is repeated except that zirconium tetrabromide is employed with generally similar results.

*Example XI*

Example II is repeated except that vanadium pentachloride is employed with generally comparable results being obtained.

*Example XII*

Example II is repeated except that chromium oxychloride instead of titanium tetrachloride is employed.

When the above examples are repeated using other halogen-containing compounds of groups IV–B, V–B and VI–B metals, such as titanium tetrabromide, titanium tetraiodide or mixed halides such as compounds or mixtures having empirical compositions corresponding to titanium difluoride dichloride, titanium monochloride trifluoride, titanium monochloride tribromide, titanium oxyhalides, particularly chlorides or mixtures of these complex salts, similar results are obtained. Other suitable metal salts which give desirable results in the above examples are hafnium fluorides and bromides, chromic bromide, chromium acetonyl acetate, molybdenum pentachloride or trichloride and mixtures thereof, tungsten halides, niobium halides, and tantalum halides, particularly the chlorides and bromides.

Solvents or mixtures of solvents are usually employed in this process. In general, any solvent which is essentially inert under reaction conditions can be employed. Particularly suitable are alkane hydrocarbon and halogenated hydrocarbon solvents although aromatic solvents can be used. When the above examples are repeated using benzene, toluene, xylene, cyclohexane, heptane, trichloroethane and trichlorobenzene, similar results are obtained. Other typical examples of suitable solvents are butane, octane, decane and higher alkane hydrocarbons, decalin, tetralin, the diethyl benzenes, the ethyl propylbenzenes, naphthalenes and similar aromatic hydrocarbon solvents. Mixed aliphatic, cyclic, and/or aromatic solvents are frequently desirable. Other halogenated solvents are tetrachlorobenzene, chloronaphthalenes, tribromobenzene, and the like.

The quantity of solvent is not critical and, in fact, quantities of solvent as low as 20 parts and as high as 1000 parts per total charge of ethylene (usually 50 to 500 parts) have been employed with very satisfactory results. When a solvent is used, the higher concentrations are frequently preferred since the solvent aids in removing the heat of polymerization and permits the maintenance of uniform temperature conditions throughout the polymerization zone. Also, a solvent permits easier continuous reactor operation. In addition, the properties of the polymer can frequently be varied by selecting solvents having different solubility for the hydrocarbon polymer. Essentially pure aliphatic solvents are normally preferred.

The following illustrates a typical operation using an alternative solvent.

*Example XIII*

The procedure of Example II was repeated except that the oxygen employed was increased to provide a mole ratio of 0.036 mole to one of titanium tetrachloride, and, in addition toluene was used instead of the hexane. A higher reaction rate was obtained and the polymer product generally had similar characteristics. When neohexane was used, instead of the toluene, the reaction rate was reduced below that of Example II. In general, when employing varying solvents or solvent mixtures, the same types of directing effect are produced by the various oxygen containing materials of the invention, differing somewhat in degree.

The polymerization can also be conducted in the absence of any solvent and in certain cases this is preferred since the polymer is obtained without being contaminated by a solvent mixture. However, in most cases it is preferred to purify the polymer by treatment with a solvent and thus the use of a solvent during reaction has certain advantages.

The following example illustrates a polymerization in the absence of any solvent.

*Example XIV*

Example I is repeated except that the solvent is eliminated and the reaction media is not agitated. External cooling is employed to maintain the reaction temperature below 120° C. A solid polyethylene polymer is produced similar to that of Example II.

Although the most significant feed material for the process is ethylene, the process is fully applicable to other unsaturated hydrocarbons, particularly those feeds having less than 12 carbon atoms. As in the case of ethylene polymerization, the oxygen containing materials exert an accelerating and directing effect on the reaction. The following examples are illustrative of the application of the process to a different hydrocarbon.

Example XV

Example II was repeated except that propylene was employed using a pressure of 50 pounds per square inch, the catalyst was heated 2½ hours prior to adding the propylene and reaction time was 5½ hours. The maximum temperature of the reaction was 110° C. The principal product was heavy lubricating oils containing some solid polypropylene.

Example XVI

Example II was repeated except that propylene was employed as the olefin and 0.05 part of benzoyl peroxide was used, the propylene pressure again was 50 pounds per square inch. The reaction time was 8½ hours and the maximum temperature was 120° C. The product consisted of heavy oils and polypropylene solids.

When the above examples are repeated employing styrene, butadiene or isoprene, similar results are obtained. Typical examples of other hydrocarbon alpha olefins are 1-butene, 1-pentene, 1-hexene, 1-octene, 1-dodecene, 2-pentene, 2-hexene, 2-octene, 2-methyl-1-butene, 3-methyl-1-butene, 4-methyl-1-pentene, 4-vinylcyclohexene, 2-methyl-2-butene, and cyclohexene.

The examples and description above clearly illustrate the beneficial effect of using the oxygen-containing catalyst adjuvants or directors of the present invention. Surprisingly, when these materials are used by themselves, at the conditions of and with the hydrocarbon feed of any of the foregoing examples, no solid polymer formation is encountered although under some circumstances, only trace amounts of oily material is formed. This demonstrates the adjuvant or promoting character of these materials. Further, when only one additional component of the catalyst system is used, in addition to the oxygen-containing adjuvant, no polymer formation is found or else it is attributable to the component solely. Thus, when oxygen and titanium tetrachloride, as used in Example II, but no aluminum, are employed, there is no detectable difference in performance from operating with titanium tetrachloride alone, viz., a small amount of oil. Similarly, when only oxygen and aluminum are used in the procedure of Example II, no detectable polymer is formed.

It will be understood, in the examples given above, that in all instances the yield of polymer product, based on the hydrocarbon fed was very high, approaching complete yield. The losses of the process primarily were occasioned by venting operations. The high yields, of course, are to be distinguished from production rate, or reaction rate, which can be visualized as the rate of "take-up" of the hydrocarbon feed.

It will be further understood that the product obtained by the aid of the primary catalyst system (viz., a group III–A metal and a refractory metal halide, with no catalyst adjuvant) is not an inferior product but compares very favorably with prior art products. The surprising features of the present invention is the availability of selectable and dual catalyst adjuvant effect realizable by these adjuvants including oxygen and peroxygen compounds.

In carrying out the process, the temperatures of the polymerization are not especially critical but are important. In general, the temperature should be in the range of 0°–250° C., although from 50°–150° C. is preferred. Likewise, a wide range of pressures can be used, from subatmospheric to 250 atmospheres, higher pressures being generally superfluous. Generally, between above 1 and 100 atmospheres of monomer pressure is preferred. In addition, other inert atmospheres, such as nitrogen or hydrogen, can be employed and are sometimes desired.

The solid polymers which can be generated by this process are useful in essentially all the many present and potential applications of polyolefines. Specifically, the products can be used in the production of sheets, films, fibers, coating and molded articles. The solid material can be extruded, injection molded and processed by other conventional techniques. It is particularly useful for electrical insulation, bottles, toys and in some cases structural applications. The greater crystallinity of this material makes it particularly suitable for fibers, and uses wherein it is subjected to relatively high temperatures, and uses requiring additional rigidity and improved strength properties, such as tensile strength. In the case of the liquid, oily or semi-waxy materials, these materials can be used for cases such as paper or fiber impregnants, adhesive tack modifiers, hydraulic fluids and for other compounding purposes.

We claim:

1. A process for the polymerization of a hydrocarbon olefin selected from the group consisting of ethylene and propylene to produce a predominantly solid polymer comprising polymerizing said olefin at a temperature of between about 0° and about 250° C., and at a pressure up to about 250 atmospheres in the presence of a catalyst comprising a metal of Group III–A of the Mendeleev Periodic Table, a halide of a metal selected from the group consisting of Groups IV–B, V–B and VI–B of the Mendeleev Periodic Table, and from about 0.001 to about 0.1 mole of a catalyst adjuvant material selected from the group consisting of molecular oxygen and peroxides per mole of said halide, said Mendeleev Periodic Table corresponding to the table on pages 392 and 393 of the Handbook of Chemistry and Physics, 36th edition, Chemical Rubber Publishing Company.

2. A polymerization catalyst comprising a metal of Group III–A of the Mendeleev Periodic Table, a halide of a metal selected from the group consisting of Groups IV–B, V–B and VI–B of the Mendeleev Periodic Table and a catalyst adjuvant material selected from the group consisting of molecular oxygen and peroxides wherein said metal is present in from about 0.01 to about 100 moles and the catalyst adjuvant material is present in from about 0.001 to about 0.1 mole, both per mole of halide, said periodic table corresponding to the table on pages 392 and 393 of the Handbook of Chemistry and Physics, 36th edition, Chemical Rubber Publishing Company.

3. The process of claim 1 wherein the catalyst adjuvant is oxygen.

4. The process of claim 1 wherein the catalyst adjuvant is an inorganic peroxide.

5. The process of claim 1 wherein the catalyst adjuvant is an organic peroxide.

6. The process of claim 1 wherein the polymerization temperature is between about 50–150° C. and the olefin is ethylene, said ethylene being employed at a pressure between about 1–100 atmospheres.

References Cited in the file of this patent

UNITED STATES PATENTS

| | | |
|---|---|---|
| 2,692,259 | Peters | Oct. 19, 1954 |
| 2,721,189 | Anderson | Oct. 18, 1955 |
| 2,762,791 | Pease | Sept. 11, 1956 |
| 2,822,357 | Brebner et al. | Feb. 4, 1958 |

FOREIGN PATENTS

| | | |
|---|---|---|
| 874,215 | Germany | Sept. 24, 1953 |
| 533,362 | Belgium | May 16, 1955 |

OTHER REFERENCES

Zeitschrift für Anorganische Chemie (Band 128), pages 81–95, February 23, 1923, "Die Reduktion des Titantetrachlorids," by Ruff et al.